3,307,144
BATHYMETRY

David Epstein and Sidney Epstein, Brooklyn, N.Y., assignors to Vadys Associates, Ltd., Brooklyn, N.Y., a corporation of New York
Filed Jan. 22, 1965, Ser. No. 427,350
4 Claims. (Cl. 340—5)

This invention relates to apparatus and methods for making depth measurements in the ocean from an aircraft or surface vessel and more particularly to a method and apparatus to perform large scale bathymetric surveys of the deep ocean from an aircraft.

It is often necessary to perform a depth survey of a large body of water. In shallow water, prior art echo-sounding or sonor type systems provide required range and resolution without undue size or complexity; and bathymetric surveys have been made from both aircraft and surface vessels. To perform a bathymetric survey from a fixed wing aircraft, a sonobuoy is required at the water/air interface. Most if not all of these aircraft-mode systems are of the type disclosed in U.S. Patent No. 3,119,090 to Springer, which utilizes a sonobuoy containing a sonar transmitter, sonar transducer, sonar receiver, and a radio transmitter to effect a single depth determination in the immediate vicinity (directly below) said sonobuoy. The depth information is telemetered to the radio receiver located in the aircraft. In deep water, factors such as attenuation and beam spreading (due to increased range requirement), beam bending (due to inhomogeneities of the medium) and beam deviations (due to surface wave motion) demand expensive and complex equipment if system performance is not to be degraded to the point of uselessness. A description of a sophisticated, deep water, echo sounding system for performing a bathymetric survey from a surface vessel is given in Electronic Design on page 26 No. 21, vol. 12 (1964).

Briefly, the primary objective of the subject invention is to provide a novel bathymetric survey (from an aircraft) technique more versatile (depth measurements may be effected in either shallow or deep water) and economic than the one described in the cited patent. In lieu of the now usually required multiplicity of sonobuoys (which in most instances must be expendable) to survey an area, the subject invention requires only one sonobuoy and a multiplicity of highly expendable explosive charge transmitters. Further, said sonobuoy does not require a sonor transmitter. An aircraft, say, drops the sonobuoy, preferably at a central location within the area to be surveyed, then drops the explosive charge transmitters (hereinafter called charges for short) along a predetermined path so as to blanket the area and obtain the desired horizontal resolution. The aircraft carries apparatus to automatically record depths and associated locations of points where charges were dropped. Each of the charges sink to the bottom and are fused to detonate at a predetermined time. The direct ray of the explosive shock wave acoustic signal is received by the sonobuoy and telemetered to the aircraft. The water depth at the point where a charge hits bottom is determined by measuring the "bubble pulse" interval, $T_1$, and automatically solving the following formula (given by D. E. Weston in the Proc. Phys. Soc. (London) on page 233 of vol. 76 (1960) for the hydrostatic depth, $z$:

$$T_1 = kw^{1/3}z^{-5/6} \quad (1)$$

where $z$ is the hydrostatic depth (the actual depth plus 33 feet) in feet; $w$ is the weight of the explosive charge in pounds; $k$ is a factor of proporitionality which is equal to 4.36 for TNT; and $T_1$ represents the time, in seconds, intermediate the primary underwater pressure pulse (main bang), due to the underwater explosion, and the first secondary pressure pulsation (first bubble pulse).

One object of the subject invention is, therefore, to provide a novel method and apparatus by which an air survey of the depth characteristics of a body of water may be measured and recorded.

Another object of the subject invention is to provide a novel method and apparatus by which a sea (ship) survey of the depth characteristics of a body of water may be measured and recorded.

Other objects and features of the invention as well as a more detailed explanation and disclosure thereof may be obtained by referring to the specification to follow and the drawings wherein.

Reference will now be made to the drawings wherein similar reference characters indicate like elements throughout.

Figure 1:
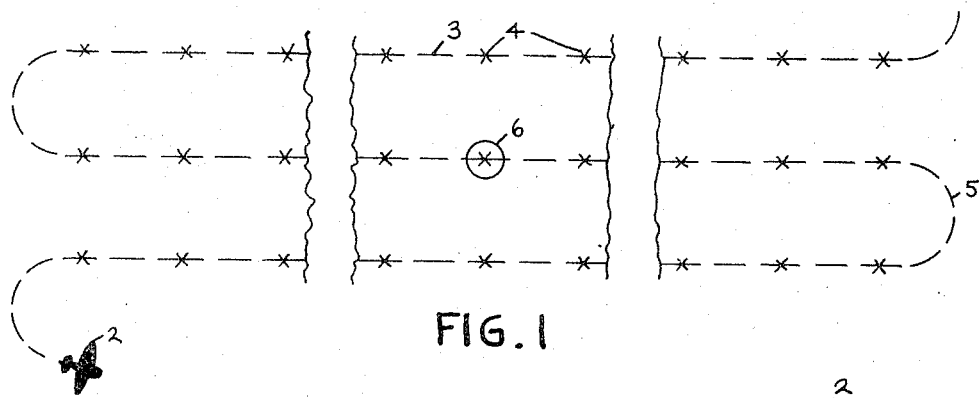
FIGURE 1 is a "birds-eye" view of the survey vehicle's track as it sows the charge field.

FIG. 1 shows the survey vehicle 2 which drops a plurality of charge transmitters 4 along a predetermined path or track 3 at predetermined intervals. The totality of charges used to blanket the survey area constitute the charge field. At some predetermined time, prior to, during, or after the sowing of the charge field, a sonobuoy 6 is dropped; preferably near the "center" of the charge field. Since details of sonobuoy construction and operation are well known and the required characteristics of sonobuoy 6 have been previously given, they will not be discussed further.

Figure 2:
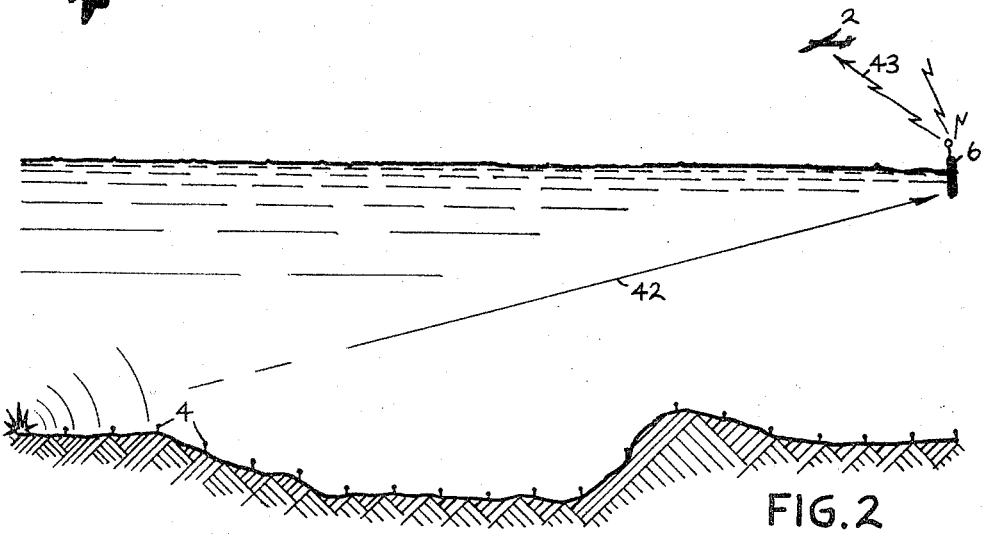
FIGURE 2 is an elevation view showing one leg of the survey track in cross section, one charge of a charge field in sonic relation to the sonobuoy, and the sonobuoy in electronic relation to the survey aircraft.

Referring to FIG. 2, by way of illustration a representative area of $1.6 \times 10^3$ square kilometers (i.e. 40 kilometers on a side) with an average depth in the order of 5 kilometers is selected to undergo a bathymetric survey. An aircraft traveling at say 100 knots, dropping a charge every 20 seconds will give a bathymetric map with a resolution of approximately 1 kilometer. Since the free fall sinking rate of a charge transmitter 4 is in the order of $1 \times 10^3$ feet/minute, it will take approximately 15 minutes for a charge to reach the bottom. The detonation timer control 16 of each charge must be preset to insure that the bottom is reached prior to detonation. Additional delays may be superimposed for more elaborate coding purposes. If, as in this illustration, all charge detonation timer controls are set for 20 minutes (15 minutes to reach the maximum expected depth plus a 5 minute safety factor), sonic signals will arrive at the sonobuoy 6 from the individual charges of the charge field in the order of placement and 20 seconds apart once the initial 20 minute interval has elapsed. Some interruptions in the 20 second sequence may occur, e.g., when the vehicle 2 swings around 5 to sow the next leg in the charge field pattern. If no information concerning the maximum depth is known, one or more test charges may be dropped in the area before the charge field is sown.

Figure 3:
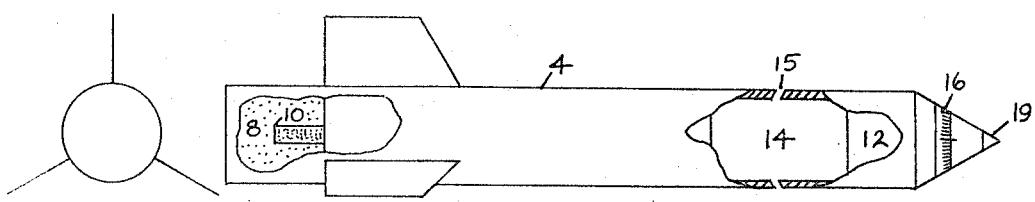
FIGURE 3 is a side view, in partial cross section, of the explosive charge transmitter.
Figure 4:
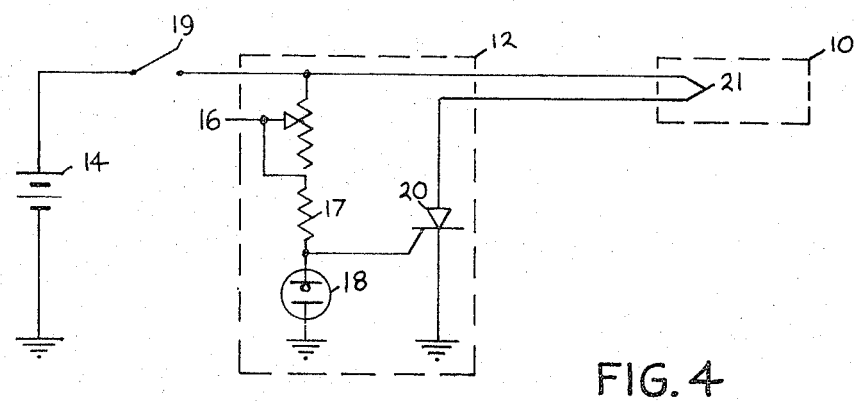
FIGURE 4 is a schematic wiring diagram for the detonation timer.

A sketch of the presently preferred embodiment of the charge transmitter 4 is shown in FIG. 3. Where necessary, the outer housing of the charge transmitter 4 is designed to resist the hydrostatic pressures at the maximum depths expected. The charge transmitter 4 contains a main explosive charge 8, detonator cap 10, electronics package 12, seawater activated battery 14, detonation timer control 16, and arming switch 19. One or more ports 15 allow water access to battery 14. A schematic diagram of the charge electronics is shown in FIG. 4. The detonation timer consists of the high resistance rheostat 16, which provides control over the variable pre-settable portion of the detonation time delay; the high fixed resistance 17, which provides the basic minimum detonation time delay portion of the overall detonation time delay; the electrolytic timer cell 18 and the semiconductor "switch" 20, e.g., a silicon controlled rectifier (SCR). Characteristics of the electrolytic timer cell are described by Herbert Feitler in "Simple Cell Competes With Complex Components," Electronics, page 67, No. 29, vol. 37 (1964). During the plating phase of 18, the voltage drop across the "trigger" contact of the semiconductor switch 20 is insufficient to "fire" it. At the completion of the desired detonation time delay, the voltage drop across 18 rises sharply, causing 20 to conduct firing current through the igniting or exploding wire 21 of the detonator cap 10.

Figure 5:
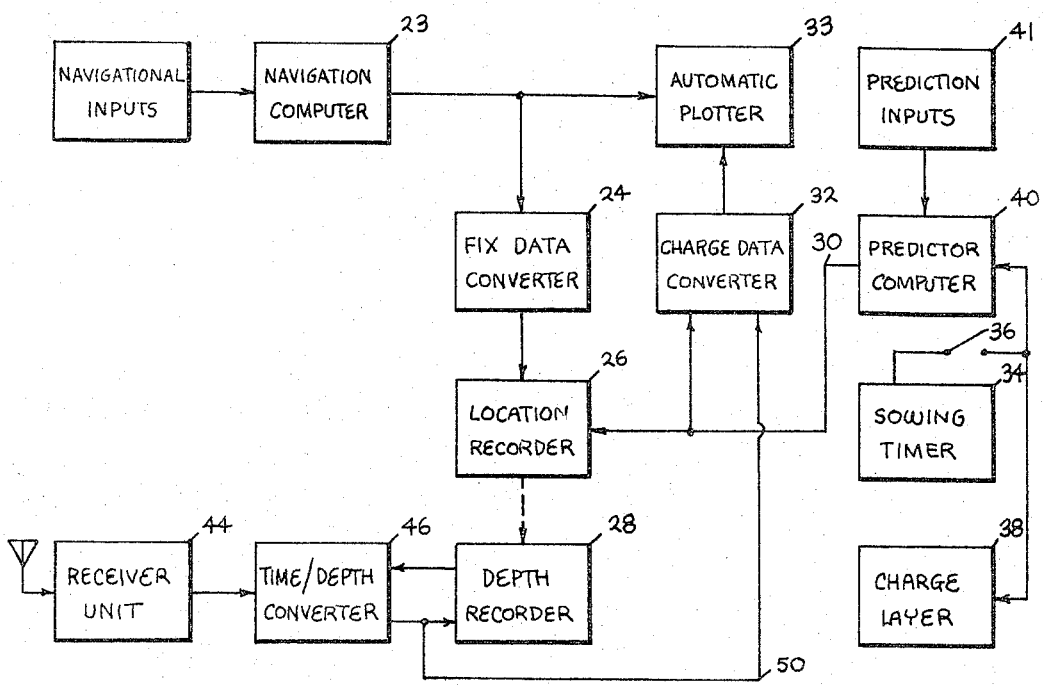
FIGURE 5 is a block diagram of the principal component units for a depth measuring and recording system.

Refer now to FIG. 5. High-precision navigational and position-fixing systems for marine surveys are used to locate both the area to be surveyed and the points therein at which depth is to be measured. For example, a variant of the Decca system (see "The Decca Navigator System as an Aid to Survey" and "Navigation and Surveying Systems" obtainable from General Precision Decca Systems of Washington, D.C.) has an automatic plotter with a pictorial display map 33 on which the desired survey track may be pre-drawn; as the vehicle moves, the actual track 3 of the vehicle is superimposed on the map. By comparing the actual track with the desired track, the pilot (or automatic pilot) is able to make necessary tracking corrections. Since the navigation computer unit 23 of any navigation system must generate a pair of coordinates to fix vehicle position, fix information is sent to the fix input converter unit 24 whose function it is to make the fix data compatible with the fix format of the presently preferred embodiment of the associated bathymetric survey data processing equipment. The digital fix data, in latitude and longitude, hyperbolic coordinates, et cetera, is sent to a continuously updated set of buffer registers in the location recorder unit 26. Typically, 26 contains a tape recorder, high-speed printer or card punch, and will, say, punch the identification number and location coordinates of a charge on a card and transfer the card to the depth recorder unit 28 in response to a pulse on line 30. The cards are stacked, in sequence, in 28. Simultaneously, a pulse is delivered from line 30 to the charge location data conversion unit 32 to cause the navigation system automatic plotter and display unit 33 to make a distinctive mark along the actual track of the vehicle at the position of each charge, e.g., a short, sharp line at right angles to the actual track.

The pre-set sowing timer unit 34 generates a train of pulses with a period, $t_s$; for the illustrative example above, $t_s$ was set at 20 seconds. This train of pulses is gated by the manual interrupt switch 36; each pulse allowed through activates the bomb release type charge transmitter dropping unit 38 which drops a charge 4. Simultaneously said pulse is transmitted to the charge location prediction computer unit 40 which operates on measured and estimated physical input variables 41 such as aircraft altitude, heading, velocity and ocean current velocity as do bombing computers, and delays, said pulse for exit on line 30 at the proper time to accurately predict and record charge location. As previously stated, cards, each with its charge identification number and location data punched by charge location recorder unit 26, are queued up in the depth recorder unit 28 awaiting the expiration of the charge detonation time delay, $t_d$, since $t_d$ is ordinarily much greater than $t_s$. After the initial delay, $t_d$+sonic travel time from charge transmitter 4 to sonobuoy 6 (electronic propagation delays are neglected), the "main bang" and first bubble pulse of the first charge arrive at the telemetry receiver unit 44 via the sonic path 42, sonobuoy 6, and electronic path 43. The demodulated replica of the main bang/first bubble pulse combination signal, hereinafter called the depth signal, is fed from 44 to the time/depth converter unit 46.

Apparatus suitable for measuring the time interval intermediate the primary pressure pulse and the first bubble pulse, $T_1$, is disclosed by Burbeck in Patent No. 2,665,410 wherein said time interval may be read out numerically or in the form of a digitally encoded number. Automatic time/depth conversion may be effected by means of a conversion scheme similar to the one described by Richards on pages 311 to 313 of "Arithmetic Operations in Digital Computers," D. Van Nostrand, (1955); wherein numbers are mapped from one digital code into another digital code. Herein, digitally encoded numbers representing duration of time interval, $T_1$, are mapped into digitally encoded numbers representing hydrostatic depth, $z$, in accordance with the functional relationship given by transposing Eq. 1; viz.:

$$z = KT_1^{-6/5} \qquad (2)$$

where $$K = k^{6/5} w^{2/5} \qquad (3)$$

Alternately, and if a digital computer is available for on-line duty, a computer sub-routine may be programmed to solve Equation 2. The time interval measuring apparatus and the time/depth conversion apparatus, in tandem, constitute the converter unit 46. The output of said unit presents depth, $z$, in a suitable digital code, to the buffer register of the depth recorder unit 28. Once the depth data is punched on a card, said buffer register is cleared; a pulse is sent along line 48 to reset time/depth converter unit 46 and the next card is indexed into punching position. As stated earlier, after a nominal time delay of $t_d$, the first card in the queue will have depth data of the first charge punched on it. Since charge identification and location data were previously entered, the card has all pertinent data and is stacked in another queue in preparation for later off-line data processing. Succeeding depth signals will arrive at the nominal rate of $1/t_s$ signals/second, barring intentional interruptions, i.e., manual operation of the interrupt switch 36.

*Modes of operation*

The set of cards, corresponding to a charge field, are available for off-line data processing, i.e., at some later date and at leisure, the measured data is inserted on a grid or map of the area surveyed to create or augment a bathymetric map.

At times it may be desirable to process the data on-line also, e.g., as a check on the entire operation. For such a case, FIG. 5 would be modified to the extent that the current depth data would be sent also to a buffer register in the charge data conversion unit 32 via line 50. The charge data conversion unit 32 would now be required to record depth data information in close proximity to associated charge location, i.e., pertinent "mark" along the actual track of vehicle. This requirement increases the complexity of the automatic plotter/pictorial display unit 33, e.g., the actual track of the vehicle may be laid down with magnetic ink, said track to be followed by an additional x-y plotting arm with a printing mechanism in lieu of a pen which would automatically index from charge "mark" to charge "mark" after recording depth data. These requirements are well within the existing control and x-y plotter states-of-the-art. The ball shaped printer technique, developed by IBM for use in electric typewriters, containing numeric digits only could be used to advantage in this type of application.

Parenthetically, once the absolute depth is known for the first point in the field, succeeding points may be measured and recorded in terms of + and — increments. This relative depth technique would increase depth measurement precision.

If data is recorded manually, i.e., the position and depth of each charge; unit 24, 26, 28 and 32 may be deleted from FIG. 5.

In another vein, subject invention could be used by surface or undersea vessels. In such instances, sonobuoy 6, and the telemetry link 43 are not required; the airborne telemetry receiver 44 and antenna are replaced by a wideband sonar receiver which is fed by a hydrophone.

In conclusion, while we have described particular embodiments of our invention for purposes of illustration, it will be understood that various modifications and adaptations thereof may be suggested to those skilled in the art without departing from the spirit and scope of the invention as defined in the following claims.

What is claimed is:

1. In the bathymetric mapping of deep ocean areas, the steps of
    depositing a predetermined geometric pattern of negatively buoyant explosive charges on the ocean bottom,
    sequentially detonating said deposited explosive charges in predetermined time sequenced relation and
    measuring the time interval intermediate each of said detonations and the first bubble pulse resulting therefrom at a common location remote from said charges and located at the ocean-air interface.

2. In the bathymetric mapping of deep ocean areas, the steps of
    dropping a predetermined pattern of negatively buoyant explosive charges from an aircraft to effect deposition of a predetermined pattern thereof on the ocean bottom,
    depositing transmitting transducer means at the ocean-air interface in selected positional relation to said deposited pattern of charges,
    sequentially detonating said deposited explosive charges in predetermined time sequenced relation, and
    transmitting signals from the ocean-air interface representative of the time intervals intermediate each of said detonations and the first bubble pulse resulting therefrom.

3. The method as set forth in claim 2 including the steps of
    recording electric signals representative of the predicted pattern of said deposited charges and
    correlating said transmitted signals with said predicted pattern signals to selectively ascertain the depth and location at which each of said deposited charges were detonated.

4. Apparatus for bathymetric mapping of deep ocean areas comprising
    a plurality of individually detonatable explosive charges disposed in a predetermined geometric pattern on the ocean bottom,
    means for sequentially detonating all of said charges at preselected time intervals,
    means disposed at the ocean-air interface and in preselected positional disposition relative to said pattern of charges to sense the time periods intermediate each said detonation and the first bubble pulse resulting therefrom and
    means for correlating said sensed time periods with signals representative of said deposited geometric pattern for determining the depth and location of each of said detonated charges.

References Cited by the Examiner

UNITED STATES PATENTS 3,148,618  9/1964  Richard _____ 102—7

OTHER REFERENCES

Popular Mechanics, May 1941, pp. 114A, 728 and 729 relied on.

CHESTER L. JUSTUS, *Primary Examiner.*

R. A. FARLEY, *Assistant Examiner.*